United States Patent [19]

Simuni

[11] Patent Number: 5,318,423
[45] Date of Patent: Jun. 7, 1994

[54] DEVICE FOR TRANSFORMATION OF THE GRAPHITE INTO THE DIAMONDS

[76] Inventor: Leonid Simuni, Apt. 6 A, Far Rockaway, N.Y. 11691

[21] Appl. No.: 514,972

[22] Filed: Apr. 26, 1990

[51] Int. Cl.[5] .............................. B22F 3/08
[52] U.S. Cl. ...................... 425/1; 100/269 B; 264/24; 423/446; 425/77; 425/78; 425/174.8 E; 425/412; 425/DIG. 26
[58] Field of Search ............ 425/1, 3, 77, 78, 407, 425/412, DIG. 26, 174.8 R, 174.8 E; 100/269 R, 269 B; 264/26, 27, 84; 423/446

[56] References Cited

U.S. PATENT DOCUMENTS

| | | | |
|---|---|---|---|
| 3,082,477 | 3/1963 | Simuni | 425/77 |
| 3,157,498 | 11/1964 | Zernow et al. | 264/84 |
| 3,201,828 | 8/1965 | Fryklund | 425/77 |
| 3,408,432 | 10/1968 | Tumm et al. | 425/DIG. 26 |
| 3,546,413 | 12/1970 | Ishizuka | 425/77 |
| 3,657,917 | 4/1972 | Chelurinski | 425/77 |
| 4,524,037 | 6/1985 | Marc | 425/174.8 E |
| 4,824,617 | 4/1989 | Takeuchi et al. | 425/174.8 E |

Primary Examiner—Jay H. Woo
Assistant Examiner—Khanh P. Nguyen

[57] ABSTRACT

High-pressure high-temperature device for conversion the graphite to diamonds (DCGD) includes a container having a high pressure chamber, an inlet for introducing a fuel, an oxidizer and an electrolyte respectively into container, a generator of instantaneous electro-impulses, electrodes secured to the container and connected with the generator of instantaneous electro-impulses to produce the power electro-discharge between electrodes. DCGD includes a source of a direct electro-current and a pair of positive and negative electrodes positioned within an electrolyte for heating the graphite in the high pressure chamber. The high-pressure chamber includes a cylinder-piston unit submerged within an electrolyte. The piston of cylinder-piston unit is explosively driven toward the high-pressure chamber by the combined action of electro-discharge in the electrolyte a combustion of fuel inside of container. DCGD may be adapted for compaction other materials, for extruding, forging and the like. DCGD may be used also to provide coating, molding and hardening work pieces which must be placed in the container.

5 Claims, 1 Drawing Sheet

DEVICE FOR TRANSFORMATION OF THE GRAPHITE INTO THE DIAMONDS

BACKGROUND OF THE INVENTION

1. Field of the Invention

The present invention relates to the formation of solid compacts from powdered material and more particularly to the conversion of graphite to diamonds.

2. Prior Art

There are various systems for the production of the artificial diamonds having the high pressure chambers and electroheating devices, but the efficiency of the existing devices is not enough sufficient. The dimensions of the artificial diamonds are very limited.

The artificial and natural diamonds are widely used in the industry as tools for the drilling devices, for the processing of the metals, for the processing of the optics details and so forth. But the natural diamonds are very expensive.

It is therefore believed to be evident that any attempts to improve efficiency of the existing devices for the production of the artificial diamonds and to increase the dimensions of the artificial diamonds are very desirable. The conventional methods of forming compacts involve substantial investments and bulky equipment. U.S. Pat. No. 3,157,498 discloses the most advanced method and apparatus for explosive forming compacts from powdered material. Disadvantages of apparatus according to U.S. Pat. No. 3,157,498:

Explosives must be replaced after each operation.
A limited efficiency of method because a part of the explosive energy is spent to compress the gas in the female die.
A bulky equipment.

SUMMARY OF THE INVENTION

Accordingly, this invention has two primary objects.

It is a main object of the present invention to provide an improved device for formation of solid compacts.

Another object of the present invention is to provide an improved device for conversion of graphite to diamonds in result of combined action of electro-discharge, a combustion of fuel and the electrolytic heating.

In keeping with these objects and with others which will become apparent hereinafter, a device for conversion of graphite to diamonds (DCGD) comprises a container having a high pressure chamber, inlet means for introducing a fuel, an oxidizer and an electrolyte respectively into container, a generator of instantaneous electro-impulses, electrodes secured to the container and connected with the generator of instantaneous electro-impulses to produce the power electro-discharge between electrodes. A DCGD comprises a source of a direct electro-current and a pair of positive and negative electrodes positioned within an electrolyte for heating the graphite in the high pressure chamber 39.

The present invention will be better understood from the following explanation of the preferred embodiment taken in connection with the accompanying drawings.

DESCRIPTION OF A PREFERRED EMBODIMENT

Figure 1:
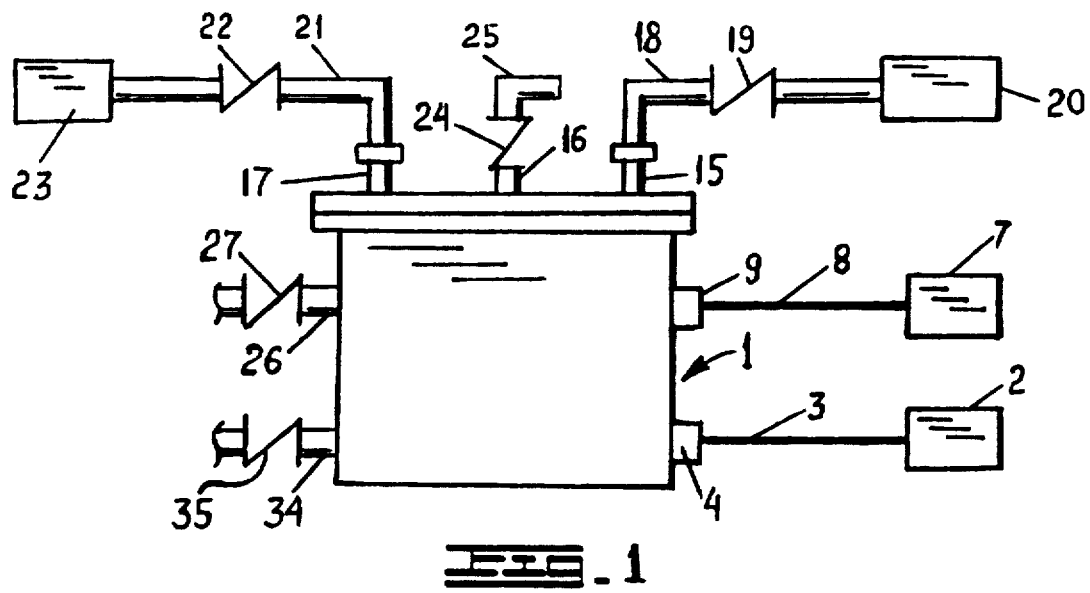
FIG. 1 is a scheme of system having the DCGD.
Figure 2:
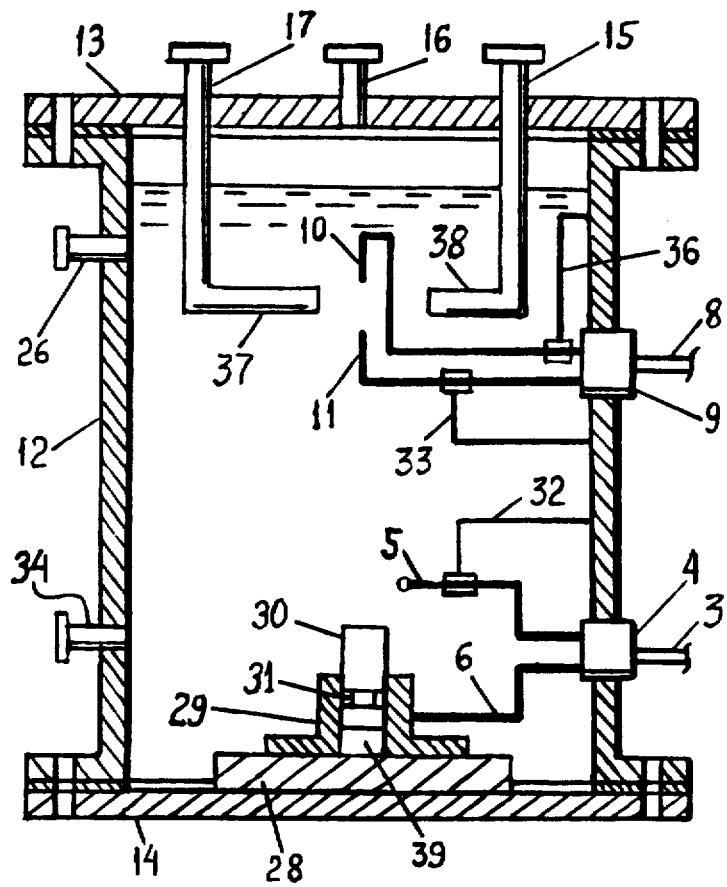
FIG. 2 is a cross section of the DCGD.

The DCGD is identified as a whole with the reference numeral 1. The DCGD 1 is connected with the generator of the instantaneous electro-impulses 7, with the source of the direct electro-current 2, with fuel and oxidizer systems 23 and 20 respectively. The container 12 comprises a cover 13, a cover 14, inlet means 17, 15, 26 for introducing a fuel, an oxidizer, an electrolyte into the container 12 respectively. An outlet means 34 and cut-off valve 35 are employed to drain an electrolyte. The cut-off valve 27 is employed for introducing an electrolyte into the container 12. The exhaust pipe 25 is joined to the outlet means 16 by the check-valve 24. A fuel system 23 is connected with the inlet means 17 by the pipe 21 having the check-valve 22. An oxidizer system 20 is connected with the inlet means 15 by the pipe 18 having the check valve 19. The inlet means 17, 15 are connected with the pipes 37, 38 respectively for introducing the fuel and oxidizer close by electrodes 10, 11 to produce the high energy impulses in the container 12.

The high pressure chamber 39 of the container 12 is formed between the cylinder 29, piston 30 and the insulating laying 28 which mounted between the cover 14 and cylinder 29. The electrodes 10 and 11 are connected with the generator 7 of the instantaneous electroimpulses by means of the cable 8. Cable 8 enters into the container 12 through the insulating box 9 to provide the hermetic insulation. The electrode is fixed to the container 12 by means of the supporting bar 33. The electrode 11 is fixed to the container 12 by means of the supporting bar 36.

The electrodes 5 and 6 are positioned in the container 12 and connected with the source of the direct electro-current 2 by means of the cable 3. Cable 3 enters into the container 12 through the insulating box 4 to provide the hermetic insulation. The positive electrode 5 and negative electrode 6 are submerged in the electrolyte.

The metal, negative electrode 6 (cathode) is joined to the cylinder 29 for heating the graphite which must be introduced into the high pressure chamber 39.

It should be apparent that numerous fluid can be utilized as electrolyte, for example, the following residue combinations or variations: $H_2O + Acids$; $H_2O + Bases$; $H_2O + Salts$. The electrode 5 is fixed to the container 12 by means of the supporting bar 32. The source of direct electro-current 2 has a tension 250–300 volt and 3–4 ampere per square centimeter.

The bars 32, 33 and 36 must be insulated from the electrodes 5, 10 and 11.

Between the cylinder 29 and the piston 30 there is a cealing ring 31 to provide a hermetic insulation. The parts of high pressure chamber 39 and materials surrounding the high pressure chamber 39 may be manufactured, for example, according to U.S. Pat. No. 3,201,828. The cylinder-piston unit having the cylinder 29 and the piston 30 is fixed to the cover 14 in the vertical position so to be submerged within the electrolyte of the container 12. It is possible to arrange several cylinder-piston units inside of container 12 and to fix it in the vertical position. The piston 30 slidably mounted in the cylinder 29 for reciprocable, vertical movement.

The cylinder 29 has the straight, cylindrical inner wall defining an aperture into which the piston 30 converges in result of shock waves.

the generator of instantaneous electro-impulses 7 produces electro-discharges between the electrodes 10, 11 and produces shock waves in the electrolyte of the container 12. The shock waves are result of both electro-discharges in the electrolyte and a combustion of fuel/oxidizer mixture. The electro-charges passing across the gap between electrodes 10, 11 cause the ignition of fuel and oxidizer which are introduced by pipes 37, 38 close by electrodes 10, 11. These combined action of electro-discharge and combustion of fuel/oxidizer mixture impacts on the outer surface of the piston 30 and forces the piston 30 toward to the high pressure chamber 39 with explosive violence. This force is sufficient to converse the graphite to diamonds. The piston 30 must be placed in the lower position before each process of conversion of graphite to diamonds.

The present invention provides the electrolytic heating the high pressure chamber. The metal cylinder 29 is joined to the negative electrode 6 for heating the graphite in result of thermo-effect of the metal cathode submerged in the electrolyte. The conversion of graphite to diamonds is result of combined action of shock waves and an electrolytic heating. It should be apparent that existing technology of the formation of solid compacts from powdered material can be utilized to apply the heat to the high-pressure chamber. It is possible, for example, to heat the powdered material before forming compacts, during forming compacts or after forming compacts. By contrast with the present invention, an apparatus disclosed in the U.S. Pat. No. 3,157,498 provides heating the powdered material only during forming compacts.

An example showing an operation of DCGD:
1. To introduce the graphite into the high-pressure chamber 39.
2. To fill the container 12 with an electrolyte.
3. To shut valves 27, 35.
4. To adjust and to provide the consumption of fuel and oxidizer.
5. To provide an electro-discharge between electrodes 10, 11.
6. To provide the electrolytic heating.
7. To remove the compact from the high pressure chamber 39.

It is apparent that the principles described above can be used not only for conversion of graphite to diamonds but also for compaction other materials, for extruding, forgoing and the like. The DCGD may be used also to provide coating, molding and hardening work pieces which must be placed in the container 12.

It is to be understood that the form of the invention herein shown and described is to be taken as a preferred example of the same, and that various changes in the shape, size and arrangement of the parts may be resorted to without departing from the spirit of this invention or the scope of the claims.

I claim:

1. A device for conversion of graphite to diamonds by compression comprising a cylinder-piston unit defining a high pressure chamber which receives the graphite therein for compression; a container accommodating said cylinder-piston unit; first inlet means for introducing an electrolyte into said container to substantially fill up the container and cover the cylinder-piston unit; a generator for producing instantaneous electro-impulses; a pair of electrodes disposed within said electrolyte, one of said electrodes secured to the container and the other one connected to the generator so that electro-discharges are produced between the pair of said electrodes; and second inlet means for introducing a fuel and an oxidizer to positions adjacent to said electrodes whereby the electro-discharges produce shock waves in the electrolyte and cause combustion of a mixture of said fuel and said oxidizer in said container to result in high energy impulses which move the piston to compress said graphite and convert said graphite to diamonds.

2. A device for conversion of graphite to diamonds by compression comprising a cylinder piston unit defining a high pressure chamber which receives the graphite therein for compression; a container accommodating said cylinder-piston unit; first inlet means for introducing an electrolyte into said container to substantially fill up the container and cover the cylinder-piston unit; a generator for producing instantaneous electro-impulses; a pair of electrodes disposed within said electrolyte, one of said electrodes secured to the container and the other one connected to the generator so that electro-discharges are produced between the pair of said electrodes; and second inlet means for introducing a fuel and an oxidizer to said container; and fuel and oxidizer systems including pipes for conveying the fuel and the oxidizer and valves for controlling the flows of said fuel and said oxidizer in said pipes wherein said pipes are connected to said second inlet means for introducing said fuel and said oxidizer to positions adjacent said pair of said electrodes whereby the electro-discharges produce shock waves in the electrolyte and cause combustion of a mixture of said fuel and said oxidizer to increase compression pressure inside the container and to increase efficiency of conversion of graphite to diamonds.

3. A device for conversion of graphite to diamonds by compression comprising a cylinder-piston unit defining a high pressure chamber which receives the graphite therein for compression; a container accommodating said cylinder-piston unit; first inlet means for introducing an electrolyte into said container to substantially fill up the container and cover the cylinder-piston unit; a generator for producing instantaneous electro-impulses; a pair of electrodes disposed within said electrolyte connected to said generator so that electro-discharges are produced between the pair of said electrodes; and second inlet means for introducing a fuel and an oxidizer to said container; fuel and oxidizer systems including pipes for conveying the fuel and the oxidizer and valves for controlling the flows of said fuel and said oxidizer in said pipes wherein said pipes are connected to said second inlet means for introducing said fuel and said oxidizer to positions adjacent said pair of said electrodes; a source for a direct electro-current; and a second pair of positive and negative electrodes connected to said source for a direct electro-current, said positive electrode positioned within the electrolyte, said negative electrode connecting said source for direct electro-current with the cylinder-piston unit to heat said cylinder-piston unit when the electro-discharges produce shock waves in the electrolyte and cause combustion of a mixture of said fuel and said oxidizer in said container to result in high energy impulses which move the piston to compress said graphite and convert said graphite to diamonds.

4. A device for conversion of graphite to diamonds as defined in claim 3, wherein said cylinder-piston unit is fixed to said container in a vertical position and is submerged within said electrolyte, wherein said cylinder has a straight, cylindrical inner wall defining an aperture, and wherein said piston is slidable mounted in said cylinder whereby said high energy impulses vertically reciprocate said piston to compress said graphite.

5. A device for conversion of graphite to diamonds as defined in claim 3, wherein said cylinder is made of metal, said positive electrode is submerged into said electrolyte and said negative electrode is fixed to said metal cylinder for heating both said cylinder and said graphite inside said high pressure chamber to a high temperature, whereby the conversion of graphite to diamonds is resulted by a combined action of said high temperature and said high energy impulses in said electrolyte.

* * * * *